United States Patent
Ullah et al.

(10) Patent No.: US 12,193,110 B2
(45) Date of Patent: Jan. 7, 2025

(54) EVENT HANDLING OF SUBSCRIBER ENTITIES

(71) Applicant: Telefonaktiebolaget LM Ericsson (publ), Stockholm (SE)

(72) Inventors: Kazi Wali Ullah, Espoo (FI); Patrik Salmela, Espoo (FI); Abu Shohel Ahmed, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 357 days.

(21) Appl. No.: 17/637,861

(22) PCT Filed: Sep. 17, 2019

(86) PCT No.: PCT/EP2019/074901
§ 371 (c)(1),
(2) Date: Feb. 24, 2022

(87) PCT Pub. No.: WO2021/052571
PCT Pub. Date: Mar. 25, 2021

(65) Prior Publication Data
US 2022/0286838 A1     Sep. 8, 2022

(51) Int. Cl.
*G06F 16/00*     (2019.01)
*H04W 8/18*     (2009.01)
*H04W 8/20*     (2009.01)

(52) U.S. Cl.
CPC .......... *H04W 8/183* (2013.01); *H04W 8/205* (2013.01)

(58) Field of Classification Search
CPC ........ G06F 8/65; G06F 16/951; G06F 16/986; G06F 3/0482; G06F 3/0484;
(Continued)

(56) References Cited

U.S. PATENT DOCUMENTS

| 2013/0267280 A1* | 10/2013 | Delco ..................... H04W 4/50 455/567 |
| 2014/0087699 A1* | 3/2014 | Madajah ................. H04W 4/12 455/412.2 |

(Continued)

OTHER PUBLICATIONS

"Remote Provisioning Architecture for Embedded UICC", Technical Specification, Version 4.0, GSM Association, Non-confidential, Official Document SGP.02, Feb. 25, 2019, pp. 1-399.

(Continued)

*Primary Examiner* — Shyue Jiunn Hwa
(74) *Attorney, Agent, or Firm* — Murphy, Bilak & Homiller, PLLC (57) ABSTRACT

There is provided mechanisms for event handling for at least one subscriber entity. A method is performed by an event handling server. The method comprises obtaining, from an RSP entity, an event registration message of the event. The event registration message comprises an identifier field containing a string of characters identifying the at least one subscriber entity. The string of characters comprises at least one marker character specifying an event type and/or indicating that the event is valid for more than one subscriber entity. The method comprises storing an event record of the event. The event record comprises the identifier field and an address of that RSP entity from which data of the event is to be fetched. The method comprises providing the event record to the at least one subscriber entity.

22 Claims, 6 Drawing Sheets

(58) Field of Classification Search
CPC .... G06F 40/143; G06F 40/103; G06F 40/151; G06F 8/24; G06F 8/30; G06F 3/016; G06F 8/61; G06F 16/22; G06F 21/572; G06F 21/74; G06F 3/067; G06F 11/10; G06F 1/18; G06F 40/205; A61B 18/1206; A61B 2018/00178; A61B 2560/0443; H04W 12/35; H04W 8/205; H04L 49/25; H04L 67/12; H04L 27/04; H05K 5/0021
See application file for complete search history.

(56) References Cited

U.S. PATENT DOCUMENTS

2016/0062954 A1* 3/2016 Ruff .................. G06F 40/205
                                                    715/249
2021/0227381 A1* 7/2021 Anand ................ H04W 8/265

OTHER PUBLICATIONS

"RSP Architecture", Version 2.2, GSM Association, Non-confidential, Official Document SGP.21, Sep. 1, 2017, pp. 1-95.
"RSP Technical Specification", Version 2.2.1, GSM Association, Official Document SGP .22, Non-confidential, Dec. 18, 2018, pp. pp. 1-250.

* cited by examiner

EVENT HANDLING OF SUBSCRIBER ENTITIES

TECHNICAL FIELD

Embodiments presented herein relate to methods, an event handling server, a remote subscriber identity module (SIM) provisioning (RSP) entity, a subscriber entity, computer programs, and a computer program product for event handling for at least one subscriber entity.

BACKGROUND

Remote SIM provisioning (RSP; where SIM is short for subscriber identity module) for consumer devices is described in "SGP.22—RSP Technical Specification", Version 2.2.1, 18 Dec. 2018, published by the GSM Association. According to this document, the subscriber entity first makes a contract with a mobile network operator (MNO). Secondly, optionally, the subscriber entity requests profile download from the MNO. Thirdly, the subscriber entity downloads a subscription profile from a server (enhanced Subscription Manager Data Preparation (SM-DP+) server) to the embedded universal integrated circuit card (eUICC) in the communication device to be provisioned. Section 3.1 of the aforementioned document describes the profile download initiation process. It indicates how the user orders a subscription from the MNO. Request/response methods are used for the MNO to request the SM-DP+ to generate a SIM profile. After profile generation, the subscriber entity can download the generated profile by contacting the SM-DP+ using the communication device. The communication device is assumed to comprise a local profile assistant (LPA) and the eUICC. The LPA acts as a proxy between the SM-DP+ and the eUICC during profile download.

The subscription manager discovery server (SM-DS) is one example of an RSP server and one of its purposes is to provide a way for the SM-DP+ to let the respective eUICCs know that there is an event waiting for it. In the current RSP specifications there are multiple deployment options possible for the SM-DS. Three functions of the SM-DS are event registration, event deletion and event retrieval. Event registration and event deletion requests are made by the SM-DP+ or from one or more local SM-DSs to a root SM-DS. Event retrieval occurs when a Local Discovery Service (LDS) makes a discovery request to the SM-DS.

The above disclosed RSP architecture allows events to be registered that are destined to a specific eUICC i.e. an event bound to a specific EID. However, there could be scenarios where one and the same event needs to be delivered to more than one eUICC. This could be cumbersome to achieve using the current RSP architecture.

Hence, there is still a need for improved RSP architectures for event handling.

SUMMARY

An object of embodiments herein is to provide efficient event handling for at least one subscriber entity.

According to a first aspect there is presented a method for event handling for at least one subscriber entity. The method is performed by an event handling server. The method comprises obtaining, from an RSP entity, an event registration message of the event. The event registration message comprises an identifier field containing a string of characters identifying the at least one subscriber entity. The string of characters comprises at least one marker character specifying an event type and/or indicating that the event is valid for more than one subscriber entity. The method comprises storing an event record of the event. The event record comprises the identifier field and an address of that RSP entity from which data of the event is to be fetched. The method comprises providing the event record to the at least one subscriber entity.

According to a second aspect there is presented an event handling server for event handling for at least one subscriber entity. The event handling server comprises processing circuitry. The processing circuitry is configured to cause the event handling server to obtain, from an RSP entity, an event registration message of the event. The event registration message comprises an identifier field containing a string of characters identifying the at least one subscriber entity. The string of characters comprises at least one marker character specifying an event type and/or indicating that the event is valid for more than one subscriber entity. The processing circuitry is configured to cause the event handling server to store an event record of the event. The event record comprises the identifier field and an address of that RSP entity from which data of the event is to be fetched. The processing circuitry is configured to cause the event handling server to provide the event record to the at least one subscriber entity.

According to a third aspect there is presented a computer program for event handling for at least one subscriber entity. The computer program comprises computer program code which, when run on processing circuitry of an event handling server, causes the event handling server to perform a method according to the first aspect.

According to a fourth aspect there is presented a method for event handling for at least one subscriber entity. The method is performed by an RSP entity. The method comprises providing, to an event handling server, an event registration message of the event. The event registration message comprises an identifier field containing a string of characters identifying the at least one subscriber entity. The string of characters comprises at least one marker character specifying an event type and/or indicating that the event is valid for more than one subscriber entity.

According to a fifth aspect there is presented an RSP entity for event handling for at least one subscriber entity. The RSP entity comprises processing circuitry. The processing circuitry is configured to cause the RSP entity to provide, to an event handling server, an event registration message of the event. The event registration message comprises an identifier field containing a string of characters identifying the at least one subscriber entity. The string of characters comprises at least one marker character specifying an event type and/or indicating that the event is valid for more than one subscriber entity.

According to a sixth aspect there is presented a computer program for event handling for at least one subscriber entity. The computer program comprises computer program code which, when run on processing circuitry of an RSP entity, causes the RSP entity to perform a method according to the fourth aspect.

According to a seventh aspect there is presented a method for event handling for a subscriber entity. The method is performed by the subscriber entity. The method comprises obtaining, from an event handling server, an event record of the event. The event record comprises an identifier field containing a string of characters identifying the subscriber entity. The string of characters comprises at least one marker character specifying an event type and/or indicating that the event is valid for more than one subscriber entity.

According to an eight aspect there is presented a subscriber entity for event handling for the subscriber entity. The subscriber entity comprises processing circuitry. The processing circuitry is configured to cause the subscriber entity to obtain, from an event handling server, an event record of the event. The event record comprises an identifier field containing a string of characters identifying the subscriber entity. The string of characters comprises at least one marker character specifying an event type and/or indicating that the event is valid for more than one subscriber entity.

According to a tenth aspect there is presented a computer program for event handling for a subscriber entity, the computer program comprising computer program code which, when run on processing circuitry of the subscriber entity, causes the subscriber entity to perform a method according to the seventh aspect.

According to an eleventh aspect there is presented a computer program product comprising a computer program according to at least one of the third aspect, the sixth aspect, and the tenth aspect and a computer readable storage medium on which the computer program is stored. The computer readable storage medium can be a non-transitory computer readable storage medium.

Advantageously, these methods, these event handling servers, these RSP entities, these subscriber entities, these computer programs, and this computer program product provide efficient event handling for at least one subscriber entity.

Advantageously, these methods, these event handling servers, these RSP entities, these subscriber entities, these computer programs, and this computer program product can be used to provide an improved RSP architecture for event handling.

Advantageously, these methods, these event handling servers, these RSP entities, these subscriber entities, these computer programs, and this computer program product allow for flexible event handling, such as event registration, event deletion and event retrieval.

Advantageously, these methods, these event handling servers, these RSP entities, these subscriber entities, these computer programs, and this computer program product enable one and the same event to be delivered to more than one subscriber entity in an efficient manner.

Advantageously, these methods, these event handling servers, these RSP entities, these subscriber entities, these computer programs, and this computer program product enable events to target groups of subscriber entities based on different properties, such as based on country, issuer, operating system version, capabilities, etc.

Advantageously, these methods, these event handling servers, these RSP entities, these subscriber entities, these computer programs, and this computer program product enable the storage space needed in the event handling server for storing event records to be reduced since one and the same event record might be valid for more than one subscriber entity.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
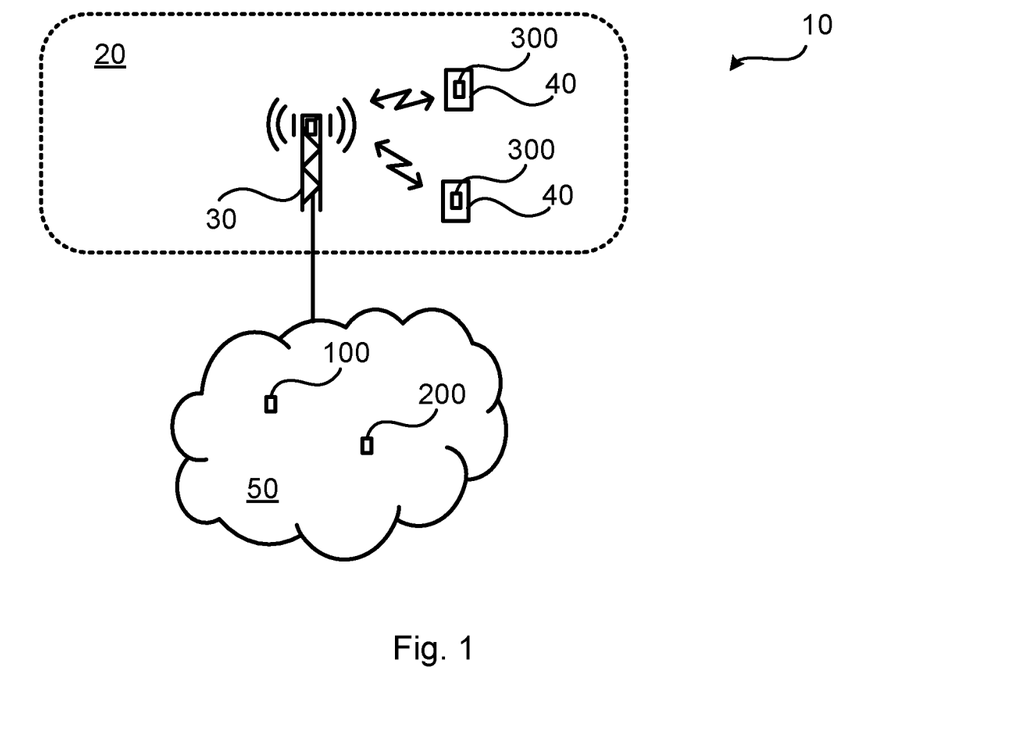
FIG. 1 is a schematic diagram illustrating a communication network according to embodiments.

FIG. 1 is a schematic diagram illustrating a communication network 10 where embodiments presented herein can be applied. The communication network 10 comprises a radio access network 20, a combined core and service network 50. In turn, the radio access network 20 comprises a radio access network node 30 and the combined core and service network 50 comprises an event handling server 100 and an RSP entity 200. In some examples the event handling server 100 is an SM-DS. In some examples the RSP entity 200 is an SM-DP+. The radio access network node 30 is configured to provide network access to, and thus to serve, wireless terminal devices 40, such as a user equipment (UE), network equipped vehicle, network equipped sensor, a so-called Internet of Things (IoT) device, or the like. Each wireless terminal device 40 comprises a respective subscriber entity 300. In some examples the subscriber entity 300 is an eUICC or an iUICC.

As the skilled person understands, the radio access network 20 as well as the combined core and service network 50 might comprise a plurality of functions, nodes, devices, and entities for facilitating communication between the wireless terminal devices 40 and the combined core and service network 50. Functions, nodes, devices, and entities not relevant for the herein disclosed embodiments have been omitted for brevity.

As noted above, there is still a need for improved RSP architectures for event handling.

According to embodiments presented herein, an event can be registered that is not bound to one particular subscriber entity 300 but rather to all or some of the subscriber entities 300. According to embodiments presented herein, an event can be registered where the event type can be registered in the field containing the EID of the subscriber entity 300. This is achieved by adapting the currently used formation of event registration messages (and event records) and the interpretation thereof. A brief summary of the the currently used formation of event registration messages, as specified in the aforementioned document "SGP.22—RSP Technical Specification" will therefore be summarized next.

According to the aforementioned document "SGP.22—RSP Technical Specification" the event registration message contains the following information: EID, RSP Server address, EventID, and ForwardingIndicator. The EID is the identity (ID) of the eUICC for which this event is generated, the RSP server address is the address of the RSP server from which this event can be retrieved, the EventID is the ID of an event that is unique, and the ForwardingIndicator is a flag that is used to indicate whether the message has to be forwarded to the root SM-DS or not.

Properties of the EID as specified in the aforementioned document "SGP.22—RSP Technical Specification" will now be summarized. The EID is 32 digits long. From left-most digit to right-mots digit the EID has the following structure: First comes a Major Industry Identifier digit of value 8 (1st digit), as defined in ISO/IEC 7812. The second left-most digit has value 9 (2nd digit) specifying telecommunications, as defined in ISO/IEC 7812. Then follows an additional three digits for country code (3rd to 5th digits). Then follows an additional three digits for issuer identifier (6th to 8th digits). An additional ten digits for issuer specific information (9th to 18th digits), of which the first five digits (9th to 13th digits) contain version information about the platform and operating system (OS), to be specified by the issuer and the last five digits (14th to 18th digits) contain additional issuer information. Then follows an additional twelve digits for the individual identification number (19th to 30th digits). The two last digits (31st to 32nd digits) containing check digits calculated over all 32 digits. An example of a string of characters defining a valid EID satisfying the above criteria is: 8900 1012 0123 4123 4012 3456 7890 1224. How this string of characters could be manipulated by replacing at least one of the characters with as many occurrences of a marker character will be disclosed in the below embodiments.

The embodiments disclosed herein relate to mechanisms for event handling for at least one subscriber entity 300. In order to obtain such mechanisms there is provided an event handling server 100, a method performed by the event handling server 100, a computer program product comprising code, for example in the form of a computer program, that when run on processing circuitry of the event handling server 100, causes the event handling server 100 to perform the method. In order to obtain such mechanisms there is further provided an RSP entity 200, a method performed by the RSP entity 200, and a computer program product comprising code, for example in the form of a computer program, that when run on processing circuitry of the RSP entity 200, causes the RSP entity 200 to perform the method. In order to obtain such mechanisms there is further provided a subscriber entity 300, a method performed by the subscriber entity 300, and a computer program product comprising code, for example in the form of a computer program, that when run on processing circuitry of the subscriber entity 300, causes the subscriber entity 300 to perform the method.

Figure 2:
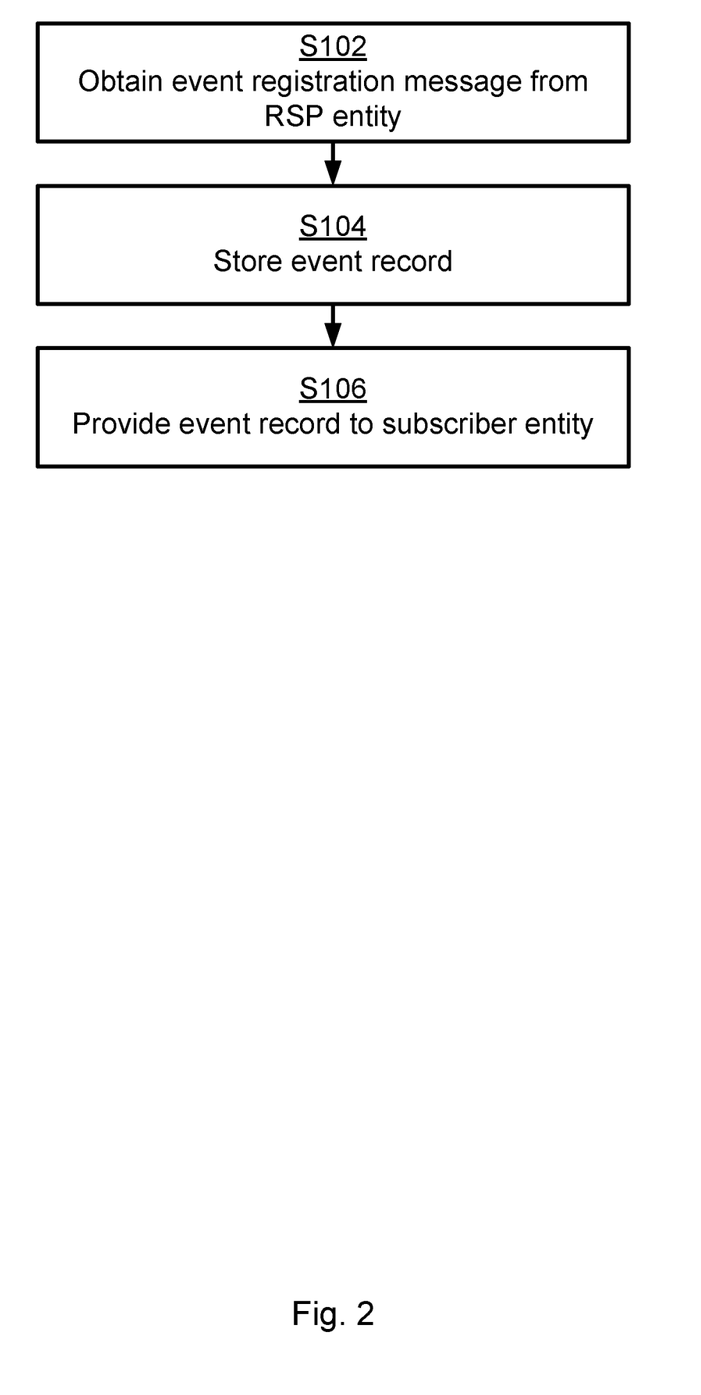
FIGS. 2, 3, and 4 are flowcharts of methods according to embodiments.

Reference is now made to FIG. 2 illustrating a method for event handling for at least one subscriber entity 300 as performed by the event handling server 100 according to an embodiment.

It is assumed that the RSP entity 200 is to register an event for at least one of the identity modules 300. Hence, the event handling server 100 is configured to perform S102:

S102: The event handling server 100 obtains, from an RSP entity 200, an event registration message of the event. The event registration message comprises an identifier field containing a string of characters identifying the at least one subscriber entity 300. The string of characters comprises at least one marker character specifying an event type and/or indicating that the event is valid for more than one subscriber entity 300. That is, the at least one marker character might either only specify an event type, or only indicating that the event is valid for more than one subscriber entity 300, or both specify an event type and indicating that the event is valid for more than one subscriber entity 300.

The event handling server 100 then stores the event so it can be accessed by the at least one subscriber entity 300. In particular, the event handling server 100 is configured to perform S104:

S104: The event handling server 100 stores an event record of the event. The event record comprises the identifier field and an address of that RSP entity from which data of the event is to be fetched. According to a first example, this RSP entity is the same RSP entity from which the event registration is obtained. According to a second example, this RSP entity is different from the RSP entity from which the event registration is obtained. That is, the data of the event might either be stored by the RSP entity having generated the event or by another RSP entity.

It is assumed that the at least one of the identity modules 300 is to be made aware of the event. Hence, the event handling server 100 is configured to perform S106:

S106: The event handling server 100 provides the event record to the at least one subscriber entity 300.

Embodiments relating to further details of event handling for at least one subscriber entity 300 as performed by the event handling server 100 will now be disclosed.

There may be different ways for the event record to be provided to the at least one subscriber entity 300.

In some aspects the event record is pulled by the at least one subscriber entity 300. In particular, according to an embodiment, the event record is in S106 provided to the at least one subscriber entity 300 upon the at least one subscriber entity 300 querying the event handling server 100 for any event intended for the at least one subscriber entity 300 by the at least one subscriber entity 300 providing its identifier to the event handling server 100.

Further aspects applicable to when the event record is pulled by the at least one subscriber entity 300 will now be disclosed.

In some aspects the event handling server 100, when providing the event record to each of the at least one subscriber entity 300, replaces any marker characters with the characters of the identifier (as received when being queried for any event) of each of the at least one subscriber entity 300 such that there is one unique event record provided to each of the at least one subscriber entity 300. Thereby, when the at least one subscriber entity 300 queries the event handling server 100 for any event intended for the at least one subscriber entity 300, the event handling server 100 will match the identifier to one or more event records (comprising one or more marker characters in the identifier field), but then when providing the event record to the at least one subscriber entity 300, the one or more marker characters are replaced such that the identifier of the subscriber entity 300 to which the event record is provided is given in the identifier field.

In some aspects, the at least one subscriber entity 300 presents a previous indicator to the event handling server 100 when pulling for potential new events which allows the event handling server 100 to refrain from sending older events. In particular, according to an embodiment, when querying the event handling server 100 for any event the at least one subscriber entity 300 provides an indicator indicating either a point in time when the at least one subscriber entity 300 most recently queried the event handling server 100 for events intended for the at least one subscriber entity 300 or the latest-most event received by the subscriber entity 300. The event handling server 100 then refrains from providing, to the at least one subscriber entity 300, any event records older than given by the indicator. There could be different examples of indicators. Non-limiting examples are sequence numbers, timestamps, etc. The event handling server 100 might mark all of events with a respective sequence number. Whenever an identity module 300 receives an event, it will also receive the sequence number. The next time the identity module 300 queries the event handling server 100, it might then send the last received sequence number to the event handling server 100. Then the event handling server 100 will only send events that have a sequence number greater than the received sequence number (and that are intended for the identity module 300).

In some aspects, the event has a timestamp which allows the event handling server 100 to purge old events. In particular, according to an embodiment, the event is associated with a timestamp indicating when the event was obtained in S102. The event record is by the event handling server 100 purged upon a predetermined amount of time having lapsed from the timestamp. The predetermined amount of time might be fixed for all events or depend on the event type or be dependent on a specific indicator provided by the RSP entity 200 in the event registration message for the event.

In some aspects, the event record is pushed to the at least one subscriber entity 300. In particular, according to an embodiment, the event record is in S106 provided to the at least one subscriber entity 300 by the event handling server 100 pushing the event record to the at least one subscriber entity 300.

For example, a global event (i.e., an event for all subscriber entities 300) should at some point be deprecated from the event handling server 100 as otherwise they would accumulate and subscriber entities 300 requesting events might start to receive a long list of events (unless the above disclosed mechanism of using an indicator indicating either a point in time when the at least one subscriber entity 300 most recently queried the event handling server 100 for events intended for the at least one subscriber entity 300 or the latest-most event received by the subscriber entity 300), some of which they have already seen and acted on before. On the event handling server side this could be resolved by keeping track, for example by means of a timestamp, of the lifetime for events after such that the event handling server 100 might purge event after a predetermined amount of time, as indicated above. The event could also be given infinite, or at least have a comparative long lifetime, to make sure all intended subscriber entities 300 obtain the event. In this case, the event should have a timestamp when it has been issued, and likewise the subscriber entities 300 should keep track of when in time a latest-most request for events was made. In this way the subscriber entities 300 will be informed if an event has already been received and processed during some earlier interaction with the event handling server 100. Further, in order for the subscriber entities 300 to from the event handling server 100 not even receive already processed events, each subscriber entity 300 could include a timestamp (as received from event handling server 100 with the events) from the previous time it fetched events from event handling server 100 in the request for events. Then the event handling server 100 could, based on the received timestamp, filter out older events that would already have been sent to the subscriber entities 300. Alternatively, the subscriber entities 300 could keep track of the creation time of the youngest event they have received. In this respect, the event handling server 100 might provide a timestamp to the subscriber entity 300, generated when the subscriber entity 300 requests events. All events at the event handling server 100 at that time that are intended for the subscriber entity 300 have an older timestamp, while events generated after this will have an even younger timestamp. The next time the same subscriber entity 300 requests events, it provides the timestamp it received during last request and that timestamp can by the event handling server 100 be used as a filter to provide to the subscriber entity 300 only events that have been created after that timestamp. Further in this respect, instead of receiving a timestamp for the event request time, the subscriber entity 300 might store the youngest timestamp from the set of events it has received, and provide that timestamp to the event handling server 100 during the next request for events and based on that the event handling server 100 might filter the events to only provide to the subscriber entity 300 those events that were created later.

There might be different types of event registration messages. In some aspects, the event registration message has an EventType field. In particular, according to an embodiment, the event registration message as obtained in S102 comprises an event type field which content specifies the event type. The content of the event type field is comprised in the event record as stored in S104. This could be the case where the at least one marker character indicates that the event is valid for more than one subscriber entity 300 but does not specify any event type. Further details of the event registration message will be disclosed with reference to FIG. 6

Figure 3:
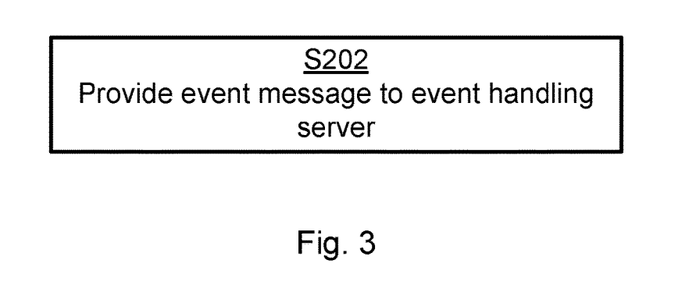

Reference is now made to FIG. 3 illustrating a method for event handling for at least one subscriber entity 300 as performed by the RSP entity 200 according to an embodiment.

It is assumed that the RSP entity 200 has generated an event for at least one subscriber entity 300 and that the event is to be registered with the event handling server 100. The RSP entity 200 is thus configured to perform S202:

S202: The RSP entity 200 provides, to an event handling server 100, an event registration message of the event. The event registration message comprises an identifier field containing a string of characters identifying the at least one subscriber entity 300. The string of characters comprises at least one marker character specifying an event type and/or indicating that the event is valid for more than one subscriber entity 300. As above, the at least one marker character might either only specify an event type, or only indicating that the event is valid for more than one subscriber entity 300, or both specify an event type and indicating that the event is valid for more than one subscriber entity 300.

Embodiments relating to further details of event handling for at least one subscriber entity 300 as performed by the RSP entity 200 will now be disclosed.

As above, there might be different types of event registration messages and in some aspects the event registration message has an EventType field. In particular, according to an embodiment, the event registration message as provided in S202 comprises an event type field which content specifies the event type.

Figure 4:
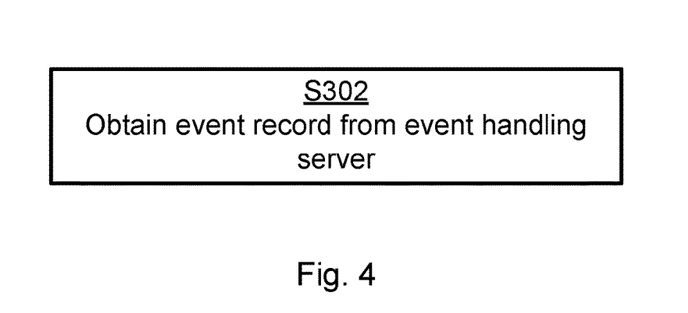

Reference is now made to FIG. 4 illustrating a method for event handling for the subscriber entity 300 as performed by the subscriber entity 300 according to an embodiment.

It is assumed that an event has been registered for subscriber entity 300. The subscriber entity 300 is thus configured to perform S302:

S302: The subscriber entity 300 obtains, from an event handling server 100, an event record of the event. The event record comprises an identifier field containing a string of characters identifying the subscriber entity 300. The string of characters comprises at least one marker character specifying an event type and/or indicating that the event is valid for more than one subscriber entity 300. As above, the at least one marker character might either only specify an event type, or only indicating that the event is valid for more than one subscriber entity 300, or both specify an event type and indicating that the event is valid for more than one subscriber entity 300.

Embodiments relating to further details of event handling for the subscriber entity 300 as performed by the subscriber entity 300 will now be disclosed.

As above, the event record might comprise an address of that RSP entity from which data of the event is to be fetched. The subscriber entity 300 might thus be configured to fetch the data of the event from this RSP entity. As noted above, the data of the event might either be stored by the RSP entity having generated the event or by another RSP entity As above, the event registration message might comprise an event type field which content specifies the event type and the content of the event type field is comprised in the event record. That is, according to an embodiment, the event record as obtained in S302 comprises content of an event type field of a registration message for the event.

There may be different ways for the event record to be obtained by the subscriber entity 300.

As above, in some aspects, the event record is pulled by the subscriber entity 300. In particular, according to an embodiment, the event record is in S302 obtained upon the subscriber entity 300 querying the event handling server 100 for any event intended for the subscriber entity 300 by the subscriber entity 300 providing its identifier to the event handling server 100.

Further aspects applicable to when the event record is pulled by the subscriber entity 300 will now be disclosed.

As above, in some aspects, the subscriber entity 300 presents a previous indicator to the event handling server 100 when pulling for potential new events. In particular, according to an embodiment, when querying the event handling server 100 for any event the subscriber entity 300 provides an indicator indicating either a point in time when the subscriber entity 300 most recently queried the event handling server 100 for events intended for the at least one subscriber entity 300 or the latest-most event received by the subscriber entity 300.

In some aspects, the event record is pushed to the subscriber entity 300. In particular, according to an embodiment, the event record is obtained in S302 by the event handling server 100 pushing the event record to the subscriber entity 300.

Figure 5:
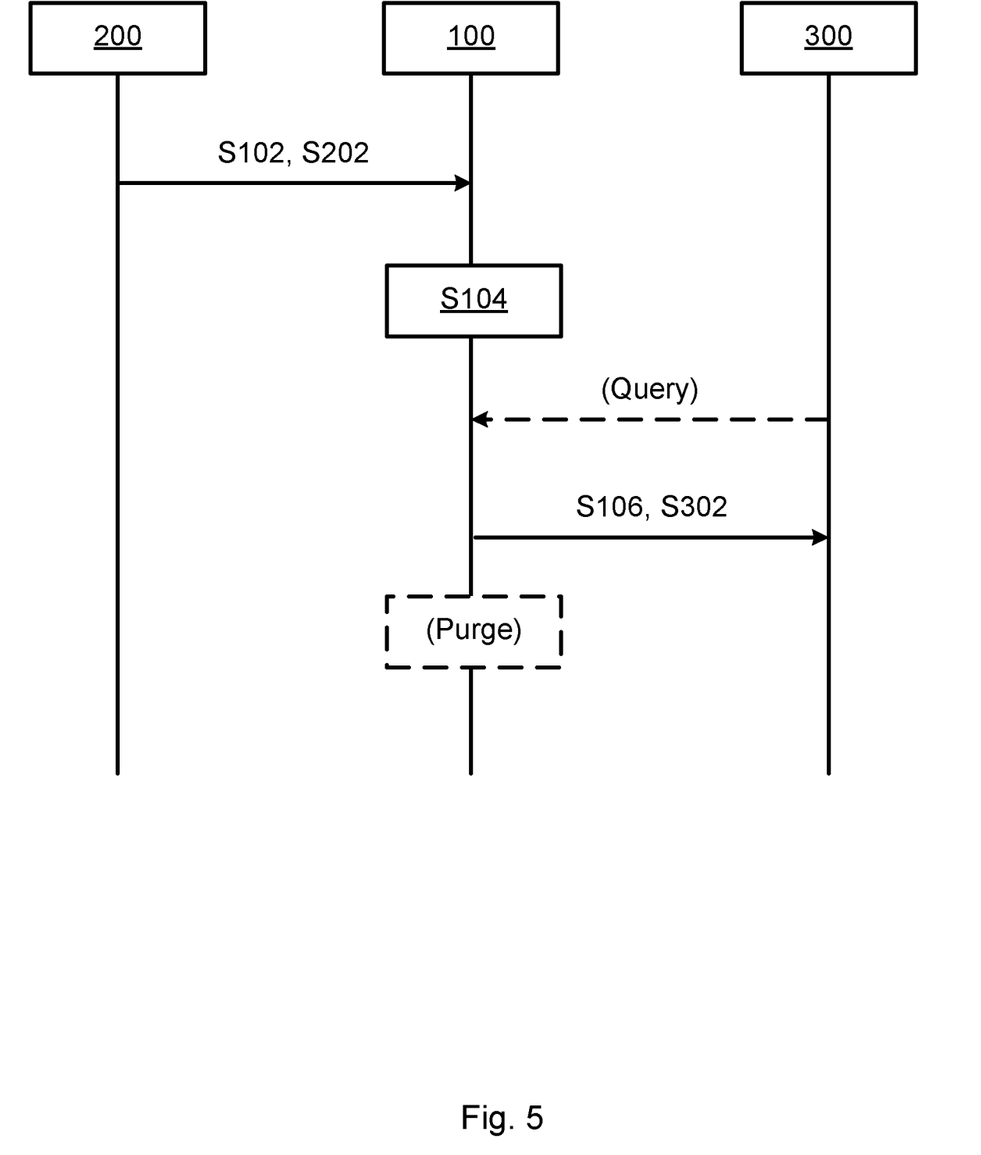
FIG. 5 is a signalling diagram according to an embodiment.

One particular embodiment for event handling for at least one subscriber entity 300 based on at least some of the above disclosed embodiments will now be disclosed in detail with reference to the signalling diagram of FIG. 5.

S102, S202: The RSP entity 200 provides, to the event handling server 100, an event registration message of the event. The event handling server 100 thus obtains the event registration message.

S104: The event handling server 100 stores an event record of the event.

The at least one subscriber entity 300, optionally, queries the event handling server 100 for any new event.

S106, S302: The event handling server 100 provides the event record to the at least one subscriber entity 300. The subscriber entity 300 thus obtains the event record. The subscriber entity 300 might then fetch the data of the event from the RSP entity indicated by the address in the event record.

The event handling server 100, optionally, purges old events.

Further aspects, embodiments, and examples applicable to any of the methods disclosed above will now be disclosed.

As above, each of the at least one subscriber entity 300 might have an EID. In some embodiments, the string of characters (i.e., the content of the identifier field), except for the at least one marker character, is composed of the EID of the at least one subscriber entity 300.

As above, the event registration message and the event record each comprises an identifier field containing a string of characters identifying the at least one subscriber entity 300 and where the string of characters comprises at least one marker character specifying an event type and/or indicating that the event is valid for more than one subscriber entity 300.

As above, the string of characters, except for the at least one marker character, is composed of the EID of the at least one subscriber entity 300. Further properties of this string of characters and its relation to the EID will now be disclosed.

In some aspects the EID is filled from the right, i.e., from least towards most significant character, with the at least one marker character. In particular, according to an embodiment, all characters of the string of characters are ordered from most significant character to least significant character, and the at least one marker character fills the string of characters in continuous sequence starting from the least significant character and towards the most significant character.

There could be different examples of marker characters. In some examples, each of the at least one marker character is represented by a respective wildcard character when the event is valid for more than one subscriber entity 300. As a non-limiting example, the wildcard character could be any of "A", "B", . . . , to "F" if the hexadecimal representation is used for representing each character in the string of characters. As another non-limiting example, the wildcard character could be "x" if the EID is handled like a string.

Three non-limiting examples of string of characters defining the content of the identifier field according to this embodiment are: 8900 1012 0123 4123 40xx xxxx xxxx xxxx, 8900 1012 xxxx xxxx xxxx xxxx xxxx xxxx, and 89xx xxxx xxxx xxxx xxxx xxxx xxxx xxxx, where each x might be represented by any of A, B, . . . , F. E.g. if only using digits 0 . . . 9 and having four bits to representing each digit, then any of the hexadecimal values A, B, . . . , F could be used as "x".

A special character (such as "x" in the above examples) could thus be used in place of a digit in the EID field.

Having an "x" or a trail of more than one "x" in the EID field will thus indicate to the event handling server 100 that the any character being an "x" need not to be matched. Furthermore, this event will match all EIDs having the same digits as the unaltered digits given in the EID field (i.e., all characters that are not marker characters). Having this understanding in the event handling server 100, a single event can be provided to more than one subscriber entity 300, such as to a large set of subscriber entities 300 or even possibly to all subscriber entities 300.

At least one marker character could additionally or alternatively be provided in between ordinary characters of the EID. That is, according to an embodiment, the at least one marker character is placed in the string of characters as being surrounded by other characters of the string of characters. Two non-limiting examples of string of characters defining the content of the identifier field according to this embodiment are: 89xx x012 0123 4123 4012 3456 7890 1224, and 89xx x012 xxxx xxxx xxxx xxxx xxxx xxxx, where each "x" could be represented as disclosed above.

This enables efficient handling of an event for all subscriber entities 300 issued by a specific issuer. For example, all characters except for the first two which have value "89" and the issuer specific characters (digits 6-18) could be replaced by the marker character. In a scenario for targeting all subscriber entities 300 issued by a specific issuer, the characters at places 6-8 would not be replaced by the marker character, but the rest of the issuer specific characters would be, while in other scenarios where some subscriber entities 300 of a specific issuer are targeted, additional issuer specific characters are not replaced by the marker character. Furthermore, some of the issuer specific characters define OS version etc. which could be kept unaltered if generating an event for all subscriber entities 300, regardless of issuer, with a specific OS version. In this case, all of the issuer specific characters that define OS version would be kept, whilst e.g. each of the characters defining the issuer identity would be replaced by the marker character (assuming all issuers use the same type of identification of OS version, etc.). Otherwise there could be a need for one event per issuer to a target specific OS version of each issuer.

In some aspects the EID is filled from the left, i.e., from most towards least significant character, with the at least one marker character. In particular, according to an embodiment, all characters of the string of characters are ordered from most significant character to least significant character, and the at least one marker character fills the string of characters in continuous sequence starting from the most significant character and towards the least significant character. In some examples, there are at least two marker characters, and those two marker characters filling the two most significant characters in the string of characters are different from "89".

Two non-limiting examples of string of characters defining the content of the identifier field according to this embodiment are: 0000 1012 0123 4123 4012 3456 7890 1224, and 3400 1012 0123 4123 4012 3456 7890 1224.

For example, an EID starting with the string "00" could indicate that the event is for all identity modules 300, i.e. that the event is a global event for all terminal devices 40. For example, an EID starting with the string "01" could indicate that the event is for all identity modules 300 in specific country, where the specific country is then given using the country codes in the EID field. For example, an EID starting with the string "02" could indicate that event is for all identity modules 300 by a specific issuer and in specific country, where the specific issuer and the country are given using the issuer and country digits in the EID field.

According to this aspect, the first two (or more) characters of an EID field could thus indicate that this event is not for one particular EID but rather for a group of EIDs or all EIDs. According to this aspect, the first two (or more) characters of an EID field could indicate that this event is of a certain event type. As above, currently it is defined that the first two digits are fixed to the values 8 and 9 respectively. Now, any other character except having the value 8 in the left-most position (1st digit) of an EID value could indicate that this event is not for a particular EID. Similarly, any other character except having the value 9 in the position adjacent the left-most position (2nd digit) could indicate the same. A combination of a specific sequence of characters (other than "89") in the two left-most characters can also be used to indicate this.

According to this aspect, the first two (or more) characters of an EID field could thus indicate that this event is not for one particular EID but rather for a group of EIDs or all EIDs and also the event type. For example, an event with an EID field starting with the sequence of characters "00" could indicate that this event is targeted for all the subscriber entities 300 to perform a certificate revocation list (CRL) update operation. As yet another example, an event with an EID field starting with the sequence of characters "34" could indicate that this event is targeted for all subscriber entities 300 belonging to a specific issuer to do an update of its software.

According to this aspect, the two right-most characters (last two digits) could still be utilized for a valid checksum which can be verified later on.

As indicated by the above examples, depending on how many marker characters there are in the string of characters, the at least one marker character might cause the event to be valid for all subscriber entities 300, all subscriber entities 300 in a specific country, all subscriber entities 300 of a specific issuer, all subscriber entities 300 of a given platform, all subscriber entities 300 of a given operating system, or any combination thereof.

There could be different examples of event types. According to some non-limiting examples, the event type pertains to one of: a CRL update event, subscriber entity 300 software update, subscriber entity 300 operating system update, granular profile update.

In some examples there are 32 characters in total in the string of characters.

Figure 6:
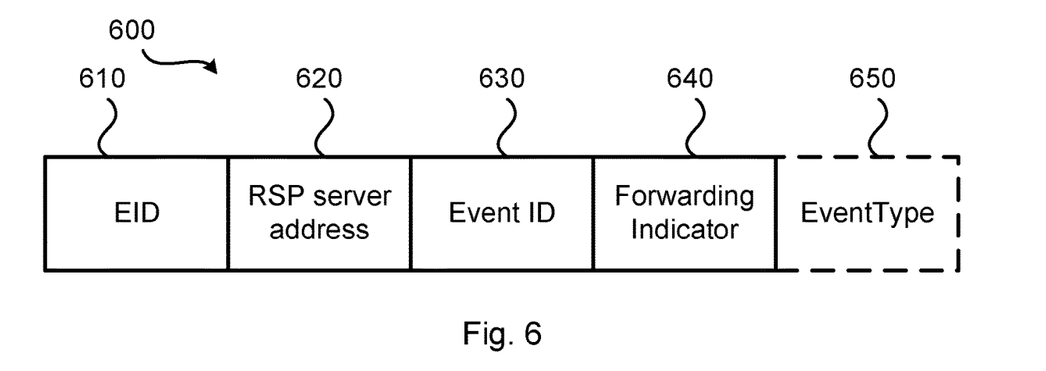
FIG. 6 is a schematic illustration of an event registration message according to embodiments.

FIG. 6 schematically illustrates an event registration message 600 according to embodiments. The event registration message 600 comprises an EID 610, an RSP Server address 620, an EventID 630, and a ForwardingIndicator 640. In addition to these fields, the event registration message 600 might comprise an EventType field 650 pertaining to the event type. Having this field will allow one more possible way of efficiently handling events. Non-limiting values for the EventType field 650 are: "download profile", "CRL update", extensions therefor, etc. For example, if the EventType is set to "Global CRL update", then the event handling server 100 might ignore the EID field and deliver the event to all subscriber entities 300.

Some implementational examples where the herein disclosed embodiments are applicable will be disclosed next.

As the skilled person these are just a few examples and the herein disclosed embodiments are applicable also to other implementation examples.

Example 1

Delivery of CRL update. Subscriber entities 300 that handle the CRL by themselves need to contact the CRL issuer after the defined time in the last received CRL. That is, the CRL indicates a lifetime of the CRL after which an update should be fetched. Assume that an intermediate CRL is generated by the CRL issuer in case of a certificate revocation of a GSMA RSP entity. However, there is currently not any way to indicate to a subscriber entity 300 that a certificate revocation has taken place. To resolve this issue, according to the herein disclosed embodiments, a global event for all subscriber entities 300 can be generated. Such a global event could thus be provided to all the subscriber entities 300. To generate such a global event, each of the right-most 30 characters in the EID is replaced by the marker character in the EID field of the event registration message. This will indicate to the event handling server 100 that this event will match to any EID requesting for an event discovery to the event handling server 100. Therefore, the event handling server 100 will provide this event to all subscriber entities 300. Alternatively, as disclosed above, the two left-most characters could be set to "00" in order to indicate that the event is for all identity modules 300.

Example 2

Issuer specific event generation. The 24 right-most characters in the EID are replaced by the marker character. This will allow events to be generated for subscriber entities 300 of a specific subscriber entity ID issuer in a specific country. This is useful if there is a need to trigger an event based on such a specific issuer. Further, to make the event solely issuer specific, marker characters could replace also the three country specific digits, which are on the left side of the issuer digits.

Example 3

Country specific event generation. The 27 right-most characters in the EID are replaced by the marker character. This will allow events to be generated for subscriber entities 300 in a specific country.

Example 4

Platform and OS specific event generation. The 19 right-most characters in the EID are replaced by the marker character. This will allow events to be generated for subscriber entities 300 of a specific issuer, in a specific country, with a particular platform and OS version.

Figure 7:
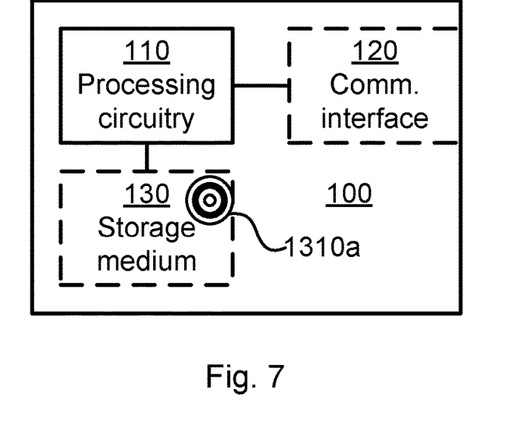
FIG. 7 is a schematic diagram showing functional units of an event handling server according to an embodiment.

FIG. 7 schematically illustrates, in terms of a number of functional units, the components of an event handling server 100 according to an embodiment. Processing circuitry 110 is provided using any combination of one or more of a suitable central processing unit (CPU), multiprocessor, microcontroller, digital signal processor (DSP), etc., capable of executing software instructions stored in a computer program product 1310*a* (as in FIG. 13), e.g. in the form of a storage medium 130. The processing circuitry 110 may further be provided as at least one application specific integrated circuit (ASIC), or field programmable gate array (FPGA).

Particularly, the processing circuitry 110 is configured to cause the event handling server 100 to perform a set of operations, or steps, as disclosed above. For example, the storage medium 130 may store the set of operations, and the processing circuitry 110 may be configured to retrieve the set of operations from the storage medium 130 to cause the event handling server 100 to perform the set of operations. The set of operations may be provided as a set of executable instructions. Thus the processing circuitry 110 is thereby arranged to execute methods as herein disclosed.

The storage medium 130 may also comprise persistent storage, which, for example, can be any single one or combination of magnetic memory, optical memory, solid state memory or even remotely mounted memory.

The event handling server 100 may further comprise a communications interface 120 for communications with other entities, functions, nodes, and devices of the communication network 10 of FIG. 1. As such the communications interface 120 may comprise one or more transmitters and receivers, comprising analogue and digital components.

The processing circuitry 110 controls the general operation of the event handling server 100 e.g. by sending data and control signals to the communications interface 120 and the storage medium 130, by receiving data and reports from the communications interface 120, and by retrieving data and instructions from the storage medium 130. Other components, as well as the related functionality, of the event handling server 100 are omitted in order not to obscure the concepts presented herein.

Figure 8:
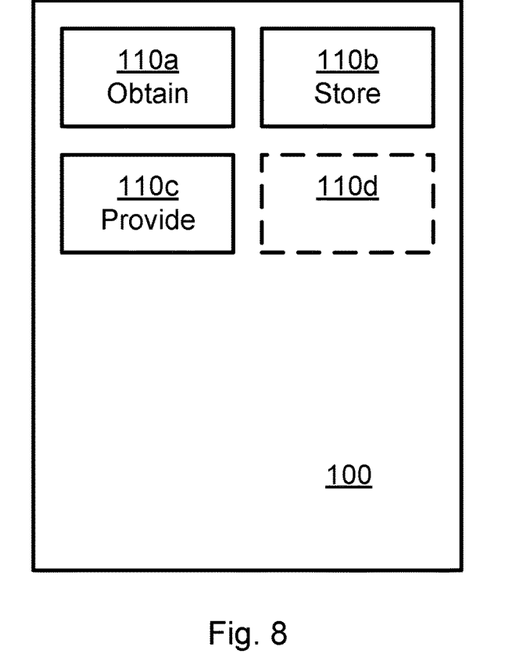
FIG. 8 is a schematic diagram showing functional modules of an event handling server according to an embodiment.

FIG. 8 schematically illustrates, in terms of a number of functional modules, the components of an event handling server 100 according to an embodiment. The event handling server 100 of FIG. 8 comprises a number of functional modules; an obtain module 110*a* configured to perform step S102, a store module 110*b* configured to perform step S104, and a provide module 110*c* configured to perform step S106. The event handling server 100 of FIG. 8 may further comprise a number of optional functional modules, as represented by functional module 110*d*. In general terms, each functional module 110*a*-110*d* may be implemented in hardware or in software. Preferably, one or more or all functional modules 110*a*-110*d* may be implemented by the processing circuitry 110, possibly in cooperation with the communications interface 120 and the storage medium 130. The processing circuitry 110 may thus be arranged to from the storage medium 130 fetch instructions as provided by a functional module 110*a*-110*d* and to execute these instructions, thereby performing any steps of the event handling server 100 as disclosed herein.

Examples of event handling servers 100 have been disclosed above with reference to FIG. 1.

Figure 9:
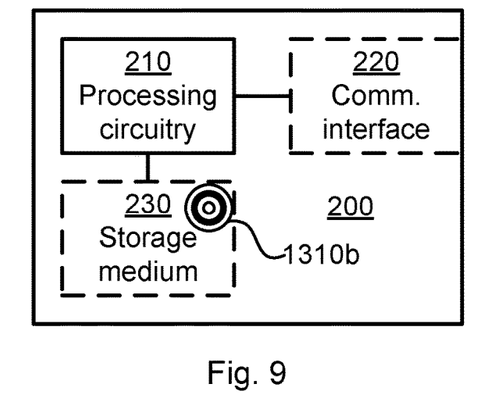
FIG. 9 is a schematic diagram showing functional units of an RSP entity according to an embodiment.

FIG. 9 schematically illustrates, in terms of a number of functional units, the components of an RSP entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1310*b* (as in FIG. 13), e.g. in the form of a storage medium 230. The processing circuitry 210 may further be provided as at least one application specific integrated circuit (ASIC), or field programmable gate array (FPGA).

Particularly, the processing circuitry 210 is configured to cause the RSP entity 200 to perform a set of operations, or steps, as disclosed above. For example, the storage medium 230 may store the set of operations, and the processing circuitry 210 may be configured to retrieve the set of operations from the storage medium 230 to cause the RSP entity 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The RSP entity 200 may further comprise a communications interface 220 for communications with other entities, functions, nodes, and devices of the communication network 10 of FIG. 1. As such the communications interface 220 may comprise one or more transmitters and receivers, comprising analogue and digital components.

The processing circuitry 210 controls the general operation of the RSP entity 200 e.g. by sending data and control signals to the communications interface 220 and the storage medium 230, by receiving data and reports from the communications interface 220, and by retrieving data and instructions from the storage medium 230. Other components, as well as the related functionality, of the RSP entity 200 are omitted in order not to obscure the concepts presented herein.

Figure 10:
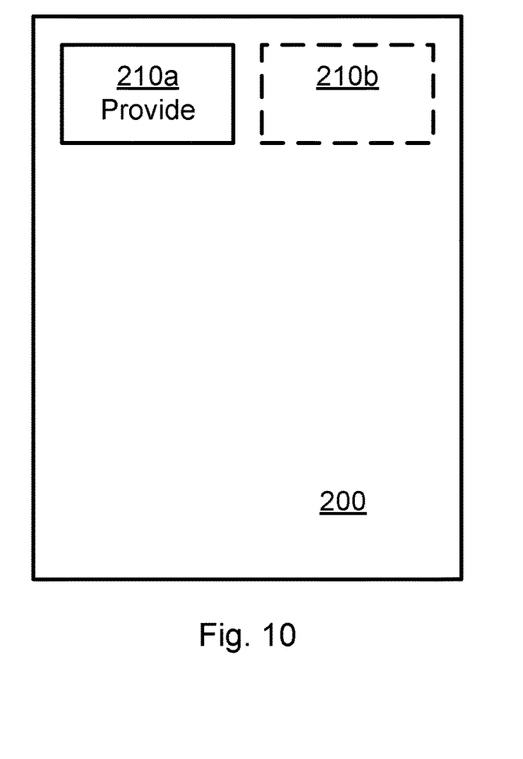
FIG. 10 is a schematic diagram showing functional modules of an RSP entity according to an embodiment.

FIG. 10 schematically illustrates, in terms of a number of functional modules, the components of an RSP entity 200 according to an embodiment. The RSP entity 200 of FIG. 10 comprises a provide module 210a configured to perform step S202. The RSP entity 200 of FIG. 10 may further comprise a number of optional functional modules, as represented by functional module 210b. In general terms, each functional module 210a-210b may be implemented in hardware or in software. Preferably, one or more or all functional modules 210a-210b may be implemented by the processing circuitry 210, possibly in cooperation with the communications interface 220 and the storage medium 230. The processing circuitry 210 may thus be arranged to from the storage medium 230 fetch instructions as provided by a functional module 210a-210b and to execute these instructions, thereby performing any steps of the RSP entity 200 as disclosed herein.

Examples of RSP entities 200 have been disclosed above with reference to FIG. 1.

Each of the event handling server 100 and/or the RSP entity 200 may be provided as a standalone device or as a part of at least one further device. These at least two nodes, or devices, may either be part of the same network part or may be spread between at least two such network parts. Thus, a first portion of the instructions performed by the event handling server 100 and/or RSP entity 200 may be executed in a respective first device, and a second portion of the of the instructions performed by the event handling server 100 and/or RSP entity 200 may be executed in a respective second device; the herein disclosed embodiments are not limited to any particular number of devices on which the instructions performed by the event handling server 100 and/or RSP entity 200 may be executed. Hence, the methods according to the herein disclosed embodiments are suitable to be performed by an event handling server 100 and/or RSP entity 200 residing in a cloud computational environment. Therefore, although a single processing circuitry 110, 210 is illustrated in FIGS. 7 and 9 the processing circuitry 110, 210 may be distributed among a plurality of devices, or nodes. The same applies to the functional modules 110a-110d, 210a-210b of FIGS. 8 and 10 and the computer programs 1320a, 1320b of FIG. 13.

Figure 11:
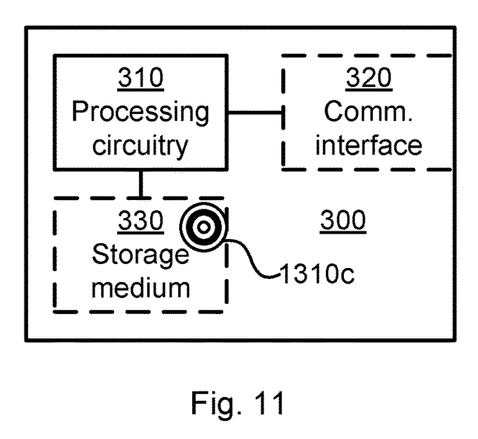
FIG. 11 is a schematic diagram showing functional units of a subscriber entity according to an embodiment.

FIG. 11 schematically illustrates, in terms of a number of functional units, the components of a subscriber entity 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1310c (as in FIG. 13), e.g. in the form of a storage medium 330. The processing circuitry 310 may further be provided as at least one application specific integrated circuit (ASIC), or field programmable gate array (FPGA).

Particularly, the processing circuitry 310 is configured to cause the subscriber entity 300 to perform a set of operations, or steps, as disclosed above. For example, the storage medium 330 may store the set of operations, and the processing circuitry 310 may be configured to retrieve the set of operations from the storage medium 330 to cause the subscriber entity 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The subscriber entity 300 may further comprise a communications interface 320 for communications with other entities, functions, nodes, and devices of the communication network 10 of FIG. 1. As such the communications interface 320 may comprise one or more transmitters and receivers, comprising analogue and digital components.

The processing circuitry 310 controls the general operation of the subscriber entity 300 e.g. by sending data and control signals to the communications interface 320 and the storage medium 330, by receiving data and reports from the communications interface 320, and by retrieving data and instructions from the storage medium 330. Other components, as well as the related functionality, of the subscriber entity 300 are omitted in order not to obscure the concepts presented herein.

Figure 12:
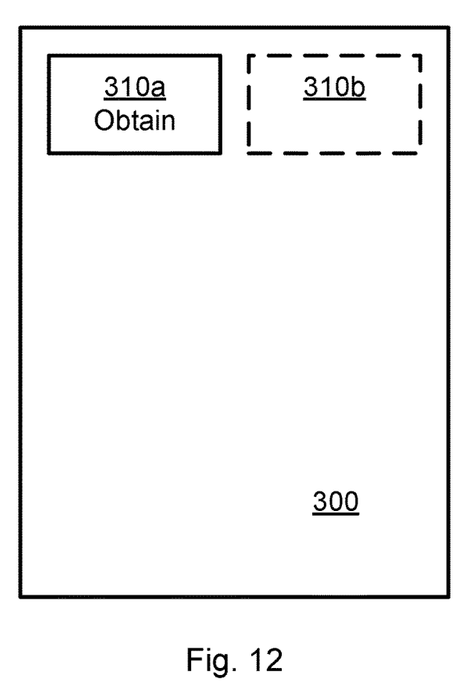
FIG. 12 is a schematic diagram showing functional modules of a subscriber entity according to an embodiment.

FIG. 12 schematically illustrates, in terms of a number of functional modules, the components of a subscriber entity 300 according to an embodiment. The subscriber entity 300 of FIG. 12 comprises an obtain module 310a configured to perform step S302. The subscriber entity 300 of FIG. 12 may further comprise a number of optional functional modules, as represented by functional module 310b. In general terms, each functional module 310a-310b may be implemented in hardware or in software. Preferably, one or more or all functional modules 310a-310b may be implemented by the processing circuitry 310, possibly in cooperation with the communications interface 320 and the storage medium 330. The processing circuitry 310 may thus be arranged to from the storage medium 330 fetch instructions as provided by a functional module 310a-310b and to execute these instructions, thereby performing any steps of the subscriber entity 300 as disclosed herein.

Examples of subscriber entities 300 have been disclosed above with reference to FIG. 1.

Figure 13:
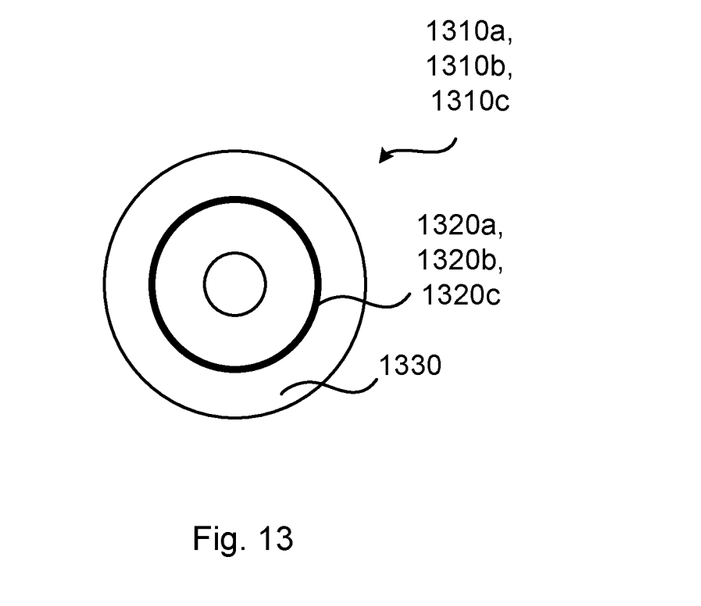
FIG. 13 shows one example of a computer program product comprising computer readable means according to an embodiment.

FIG. 13 shows one example of a computer program product 1310a, 1310b, 1310c comprising computer readable means 1330. On this computer readable means 1330, a computer program 1320a can be stored, which computer program 1320a can cause the processing circuitry 110 and thereto operatively coupled entities and devices, such as the communications interface 120 and the storage medium 130, to execute methods according to embodiments described herein. The computer program 1320a and/or computer program product 1310a may thus provide means for performing any steps of the event handling server 100 as herein disclosed. On this computer readable means 1330, a computer program 1320b can be stored, which computer program 1320b can cause the processing circuitry 210 and thereto operatively coupled entities and devices, such as the communications interface 220 and the storage medium 230, to execute methods according to embodiments described herein. The computer program 1320b and/or computer program product 1310b may thus provide means for performing any steps of the RSP entity 200 as herein disclosed. On this computer readable means 1330, a computer program 1320c can be stored, which computer program 1320c can cause the processing circuitry 310 and thereto operatively coupled entities and devices, such as the communications interface 320 and the storage medium 330, to execute methods according to embodiments described herein. The computer program 1320c and/or computer program product 1310c may thus provide means for performing any steps of the subscriber entity 300 as herein disclosed.

In the example of FIG. 13, the computer program product 1310a, 1310b, 1310c is illustrated as an optical disc, such as a CD (compact disc) or a DVD (digital versatile disc) or a Blu-Ray disc. The computer program product 1310a, 1310b, 1310c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320a, 1320b, 1320c is here schematically shown as a track on the depicted optical disk, the computer program 1320a, 1320b, 1320c can be stored in any way which is suitable for the computer program product 1310a, 1310b, 1310c.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method performed by an event handling server in a communication network for event handling for at least one subscriber entity in the communication network, the method comprising:
obtaining, from a remote subscriber identity module provisioning (RSP) entity in the communication network, an event registration message for an event associated with RSP, wherein:
the event registration message comprises an identifier field containing a string of characters identifying the at least one subscriber entity, and
the string of characters comprises at least one marker character that indicates one or more of the following: an event type for the event, and that the event is valid for at least one subscriber entity;
storing an event record of the event, wherein the event record comprises the identifier field and an address of the RSP entity from which data of the event is to be fetched;
receiving from a subscriber entity a query for any event intended for the subscriber entity, wherein the query comprises an identifier of the subscriber entity; and
in response to the query, providing the event record to the subscriber entity.

2. The method of claim 1, wherein:
the query includes an indicator of one of the following:
a point in time when the subscriber entity most recently queried the event handling server for events intended for the subscriber entity, or
an event record most recently received by the subscriber entity; and
providing the event record comprises refraining from providing, to the subscriber entity, any event records older than the indicated point in time or the indicated event record.

3. The method of claim 1, wherein:
the event is associated with a timestamp indicating when the event was obtained, and
the method further comprises purging the event record after a predetermined amount of time following the timestamp.

4. The method of claim 1, wherein:
the event registration message comprises an event type field with contents that specify the event type; and
the contents of the event type field is included in the event record.

5. The method of claim 1, wherein:
all characters of the string of characters are ordered from most significant character to least significant character; and
one of the following applies:
the at least one marker character fills the string of characters in continuous sequence starting from the least significant character and towards the most significant character, or
the at least one marker character fills the string of characters in continuous sequence starting from the most significant character and towards the least significant character.

6. The method of claim 5, wherein:
there are at least two marker characters that fill the string of characters in continuous sequence starting from the most significant character and towards the least significant character, and
the two marker characters filling the two most significant characters in the string of characters are different from "89".

7. The method of claim 1, wherein one or more of the following applies:
the at least one marker characters are represented by respective wildcard characters when the event is valid for more than one subscriber entity; and
the at least one marker character is placed in the string of characters as being surrounded by other characters of the string of characters.

8. A method performed by a remote subscriber identity module provisioning (RSP) entity in a communication network for event handling for at least one subscriber entity in the communication network, the method comprising:
providing, to an event handling server in the communication network, an event registration message for an event associated with RSP, wherein the event registration message comprises an identifier field containing a string of characters identifying the at least one subscriber entity, and wherein the string of characters comprises at least one marker character that indicates one or more of the following: an event type for the event, and that the event is valid for at least one subscriber entity; and in response to a fetch from a subscriber entity to an address of the RSP entity included in an event record of the event, providing data of the event to the subscriber entity.

9. The method of claim 8, wherein the event registration message comprises an event type field with contents that specify the event type.

10. The method of claim 8, wherein:

all characters of the string of characters are ordered from most significant character to least significant character; and one of the following applies:

the at least one marker character fills the string of characters in continuous sequence starting from the least significant character and towards the most significant character, or the at least one marker character fills the string of characters in continuous sequence starting from the most significant character and towards the least significant character.

11. The method of claim 10, wherein;

there are at least two marker characters that fill the string of characters in continuous sequence starting from the most significant character and towards the least significant character, and the two marker characters filling the two most significant characters in the string of characters are different from "89".

12. The method of claim 8, wherein one or more of the following applies:

the at least one marker characters are represented by respective wildcard characters when the event is valid for more than one subscriber entity; and the at least one marker character is placed in the string of characters as being surrounded by other characters of the string of characters.

13. A method for event handling performed by a subscriber entity in a communication network, the method comprising:

querying an event handling server in the communication network for any event intended for the subscriber entity, wherein the query includes an identifier of the subscriber entity; and obtaining, from the event handling server in response to the querying, an event record for an event associated with remote subscriber identity module provisioning (RSP), wherein the event record comprises an identifier field containing a string of characters identifying the subscriber entity, and wherein the string of characters comprises at least one marker character that indicates one or more of the following: an event type for the event, and that the event is valid for at least one subscriber entity.

14. The method of claim 13, wherein the event record includes an event type for the event.

15. The method of claim 13, wherein the query includes an indicator of one of the following:

a point in time when the subscriber entity most recently queried the event handling server for events intended for the subscriber entity, or an event record most recently received by the subscriber entity.

16. The method of claim 13, wherein:

the subscriber entity is associated with an embedded universal integrated circuit card (eUICC) identity (EID); and the string of characters, except for the at least one marker character, is composed of the EID.

17. The method of claim 13, wherein:

all characters of the string of characters are ordered from most significant character to least significant character; and one of the following applies:

the at least one marker character fills the string of characters in continuous sequence starting from the least significant character and towards the most significant character, or the at least one marker character fills the string of characters in continuous sequence starting from the most significant character and towards the least significant character.

18. The method of claim 17, wherein:

there are at least two marker characters that fill the string of characters in continuous sequence starting from the most significant character and towards the least significant character, and the two marker characters filling the two most significant characters in the string of characters are different from "89".

19. The method of claim 13, wherein one or more of the following applies:

the at least one marker characters are represented by respective wildcard characters when the event is valid for more than one subscriber entity; and the at least one marker character is placed in the string of characters as being surrounded by other characters of the string of characters.

20. An event handling server configured for event handling for at least one subscriber entity in a communication network, the event handling server comprising processing circuitry configured to perform the method of claim 1.

21. A remote subscriber identity module provisioning (RSP) entity configured for event handling for at least one subscriber entity in a communication network, the RSP entity comprising processing circuitry configured to perform the method of claim 8.

22. A subscriber entity configured for event handling in a communication network, the subscriber entity comprising processing circuitry configured to perform the method of claim 13.

* * * * *